Dec. 23, 1947.  J. R. ORELIND ET AL  2,433,148
PLOW
Original Filed Nov. 22, 1941   3 Sheets-Sheet 3

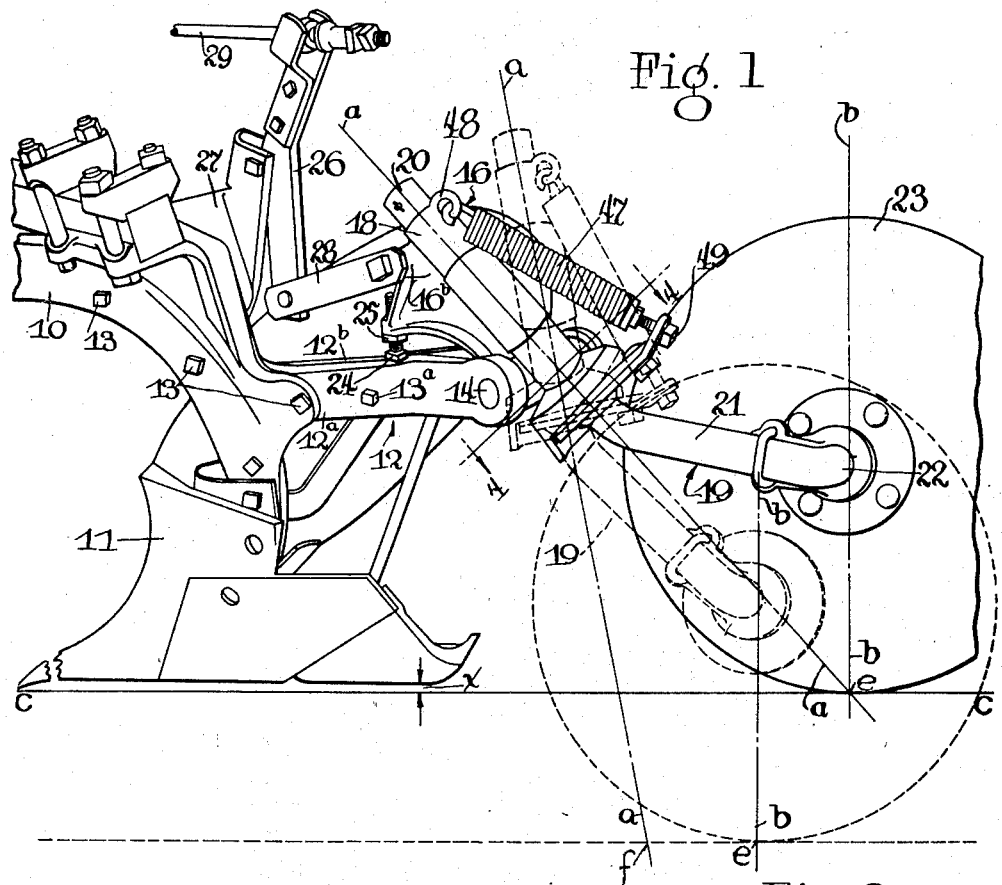

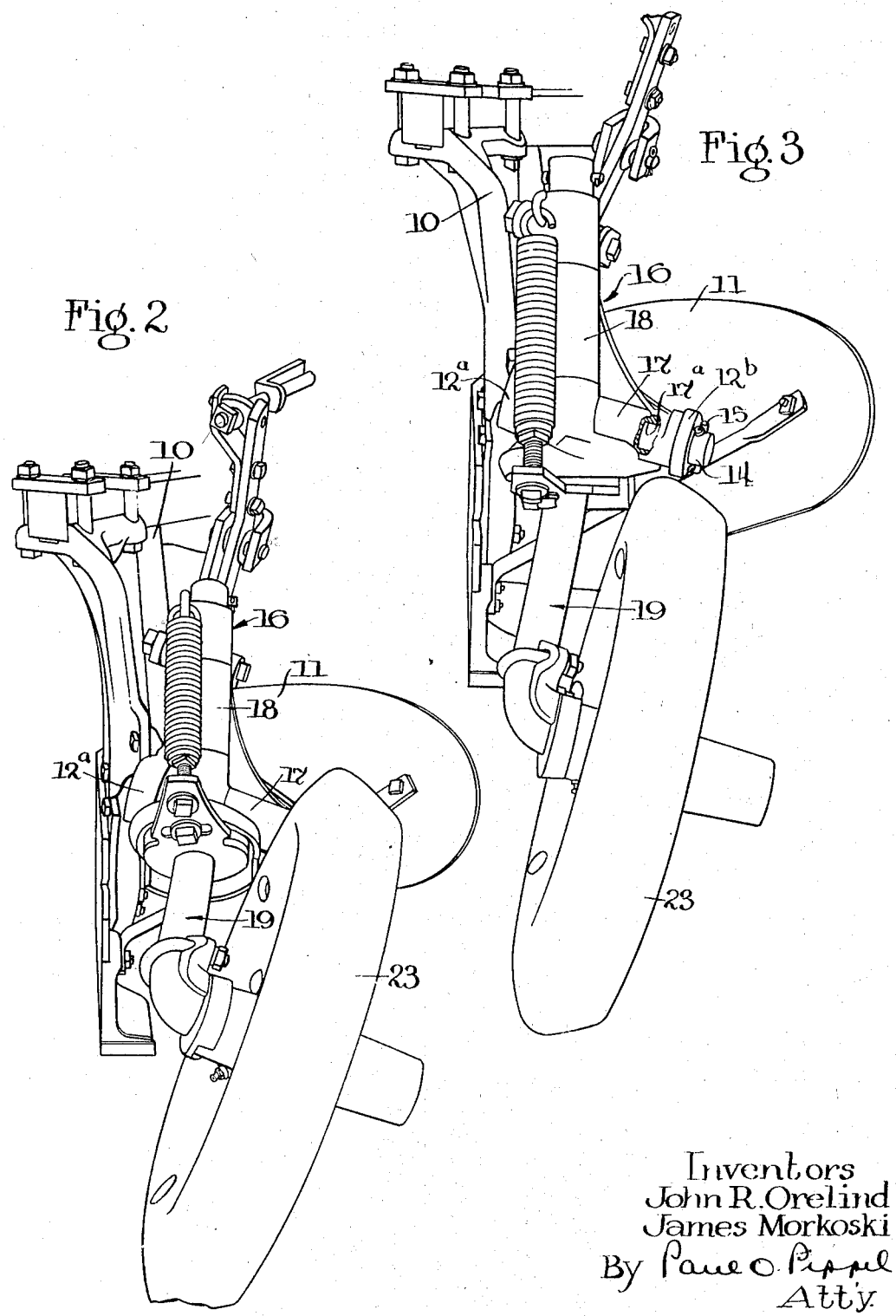

Inventors
John R. Orelind
James Morkoski
By Paul O. Pippel
Atty.

Patented Dec. 23, 1947

2,433,148

UNITED STATES PATENT OFFICE 2,433,148

PLOW

John R. Orelind, Wilmette, and James Morkoski, Canton, Ill., assignors to International Harvester Company, a corporation of New Jersey Continuation of application Serial No. 420,108, November 22, 1941. This application October 29, 1943, Serial No. 508,140

18 Claims. (Cl. 97—127)

This invention relates to a novel rear furrow wheel construction for plows. This application is a continuation of application Serial No. 420,108 (now abandoned), filed November 22, 1941.

Heretofore, the rear furrow wheels provided on plows have been unsatisfactory, since the wheels would not operate properly under all the operating positions of the plow. While the desired operation of a furrow wheel has been known, no structure has been designed prior to the present invention which would produce the desired operation.

For example, it is essential that the rear furrow wheel be so mounted that it will not caster when the plow is in an operating position. The wheel should also be positioned to rotate in a furrowwardly inclined plane when the plow is in an operating position, so that the wheel may firmly seat itself against the vertical furrow wall. It is desirable, however, that the furrow wheel caster on forward movement of the plow when the plow is raised into a transport positiond. This permits the plow to be more easily turned, since the furrow wheel will turn and not scrape over the ground. When the plow is raised, it is also desirable that the furrow wheel rotate in a substantially vertical plane. Otherwise, when rubber tires are used on the furrow wheel, the weight of the plow is carried on the side wall of the tire. Since the plow in a transport position weaves somewhat, the side walls of the tire soon wear out.

Many times when the plow is in either a transport or operating position, it is desirable to back up the plow. When the plow is backed up, the furrow wheel must not caster in either a transport position or an operating position but must stay in its trailing position.

It is, therefore, an important object of the present invention to provide an improved furrow wheel construction for plows.

Another object of the present invention is to provide a novel rear furrow wheel mounting that will hold the wheel so that it will not caster on forward or rearward movement of the plow when the plow is in an operating position, but which mounting will permit the wheel to caster on forward movement of the plow when the plow is in a transport position and at the same time will inhibit castering upon rearward movement thereof. This is particularly important when it is considered that it is frequently desirable to back up the plow in a straight line to place it in storage or to avoid obstacles encountered in plowing. This mounting also allows the wheel to rotate in a furrowwardly inclined plane from its point of contact with the furrow when the plow is in an operating position, and allows the wheel to rotate in a substantially vertical plane and ride on its periphery when the plow is in a transport position.

Another object of the present invention is to provide a furrow wheel construction that will not caster when the plow is backed up, when the plow is in either a transport or operating position.

Another object of the present invention is to provide novel means for adjusting the lead of a furrow wheel.

Another object of the present invention is to provide novel means for adjusting a furrow wheel with respect to the heel of the plow.

According to the present invention, all of these desirable features are accomplished by the following construction. The furrow wheel is journaled on an axle which in turn is journaled in the upwardly extending sleeve portion of a member that has a bearing portion which is movably mounted on a downwardly and rearwardly extending axis provided at the rear of the plow. When the plow is in an operating position, the furrow wheel lays over in the furrow or rotates in a furrowwardly inclined plane from the wheel's point of contact with the ground.

The furrow wheel will not caster in an operating position on forward or rearward movement of the plow, since the axis of the sleeve portion intersects the contact point of the furrow wheel with the ground at a point on a line determined by the direction of travel of the plow from the contact point of the furrow wheel with the ground. When the plow is in a transport position, however, the axis of the sleeve portion intersects a point on this line determined by the contact point of the furrow wheel with the ground substantially ahead of the contact point of the furrow wheel with this line so that the furrow wheel can caster on forward movement of the plow. As pointed out hereinbefore, it is important that the furrow wheel be permitted to caster upon forward movement thereof, so that the wheel will follow the tractor when it is desired to change the direction of movement thereof. It should also be noted that, when the plow is backed up, for example, into a shed for storage purposes, or to permit the removal of obstacles encountered in plowing, it is desirable that the backing-up movement be effected in a straight line and that castering of the furrow wheel be prevented. An inhibition against castering upon backing up has been accomplished by a mechanism hereinafter more fully described. By virtue of this mounting, when the member is moved to raise the plow, the furrow wheel is moved into a substantially vertical plane with respect to its inclined plane so that the furrow wheel will ride in a transport position on the periphery of the wheel. A novel means is also provided between the member and the axle for maintaining the correct amount of lead for the furrow wheel.

By virtue of this construction, a novel furrow wheel construction is provided for a plow which functions to produce a long-sought desired result.

These and other objects and advantages of the present invention will be apparent to those skilled in the art after a careful consideration of the following detailed description of a preferred structural embodiment, taken in conjunction with the accompanying drawings.

In the drawings:

Figure 1 is a perspective view of the novel rear furrow wheel construction applied to a moldboard type plow and shows the furrow wheel in its operating and transport position;

Figure 2 is a rear view of the structure shown in Figure 1 when the furrow wheel is in an operating position;

Figure 3 is a rear view of the structure shown in Figure 1 when the furrow wheel is in a transporting position;

Figure 4 is a sectional view taken along the line 4—4 of Figure 1 and shows the cam means between the member and the axle;

Figure 5 is a sectional view taken along the line 5—5 of Figure 4;

Figure 6 is a sectional view taken along the line 6—6 of Figure 4 and shows one position of the cam means;

Figure 7 is a sectional view similar to Figure 6 but shows the cam means in one of its adjusted positions;

Figure 8:
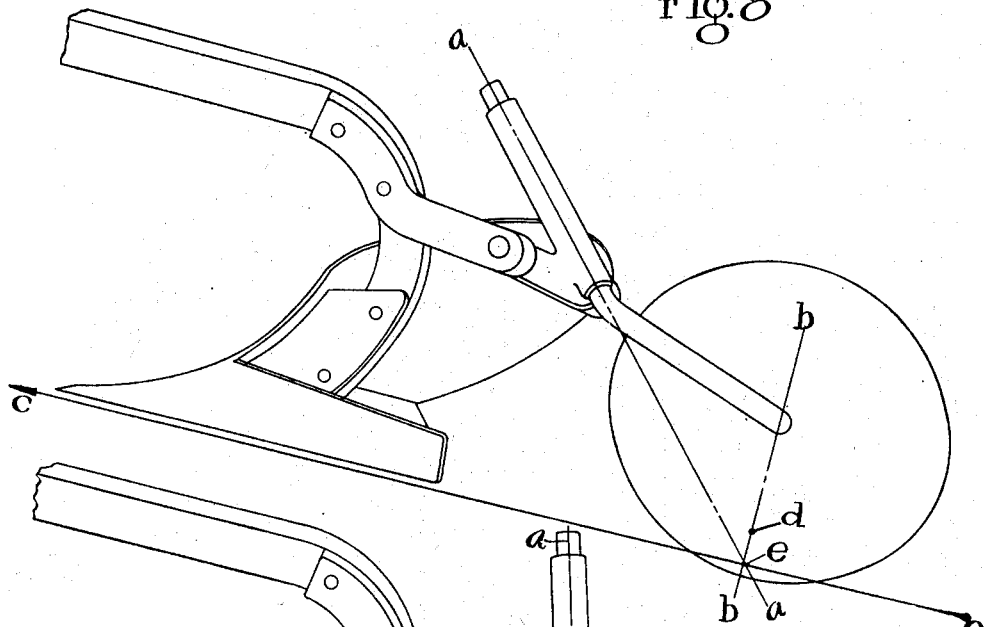
Figure 8 is a schematic view, in perspective, showing how the axis of the sleeve intersects the forward line determined by the contact point of the furrow wheel with the ground, when the plow is in an operating position.

Referring now to the drawings, more particularly to Figures 1, 2, and 3, it will be noted that the plow chosen to illustrate the principles of the present invention comprises a conventional plow beam 10, at the end of which is secured a moldboard plow bottom 11. On the rear of the beam 10 is mounted a bracket 12 that consists of bars 12ª and 12ᵇ. The bar 12ª is secured to the beam 10 by means of bolts 13 and extends rearwardly thereof, as shown in Figure 1. At the rear end of the bar 12ª is secured a shaft 14 which extends downwardly and rearwardly toward the furrowward side of the plow bottom 11. The outer end of the shaft 14 is supported in an opening provided in the bar 12ᵇ which extends forwardly and is secured to the bar 12ª by means of the rearmost bolt 13 and a bolt 13ª. A pin 15 provided in the end of the shaft 14 holds the bar 12ᵇ on the shaft 14.

On the shaft 14 is mounted a member 16 which comprises a bearing portion 17 and an upwardly extending sleeve portion 18. The portions 17 and 18 are provided with openings 17ª and 18ª respectively. As shown in Figure 3, the opening 17ª in the portion 17 is journaled on the shaft 14. When the portion 17 is mounted on the downwardly and rearwardly extending shaft 14, the portion 18 extends upwardly and forwardly, as shown in full lines in Figure 1. In the opening 18ª is journaled an axle 19. The axle 19 has a spindle portion 20 that is journaled in the opening 18ª. The spindle portion 20 extends rearwardly to a portion 21, which in turn extends downwardly and outwardly in a furrowward direction terminating in an axle portion 22 on which a furrow wheel 23 is rotatably mounted.

Referring now to Figures 1 and 2, it will be noted that the furrow wheel 23, when the plow is in an operating position, lays over in the furrow. In other words, the furrow wheel rotates in a furrowwardly inclined plane with respect to the point of contact of the wheel with the ground. This is the desired operating position of the furrow wheel, since in this way the weight of the plow on the furrow wheel and the action of the earth on the plow bottom forces the side of the furrow wheel at approximately the point $d$ into contact with the vertical furrow wall and aids in holding the rear portion of the plow in the ground, as shown in Figure 8.

The plowing position of the member 16 may be adjusted relative to the bracket 12 about the downwardly and rearwardly extending shaft 14 by adjusting the bolt 24 and lock nut 25 threaded thereon. The bolt 24 is threaded into a suitable opening provided in a portion 16ᵇ which extends forwardly from the member 16. Upon adjusting the bolt 24, the vertical distance between the contact point of the furrow wheel with the ground and the heel of the plow bottom may be increased or decreased. As shown in Figure 1, this distance is indicated by the letter $x$.

The member 16 is moved about its pivotal connection to the axle 14 by means of a bell-crank 26 which is pivotally mounted on a suitable bracket 27 secured to the plow beam 10. The lower end of the bell-crank 26 is connected to the portion 16ᵇ on the sleeve portion 18 by a link 28. The other end of the bell-crank 26 has a rod 29 connected thereto, which rod extends forwardly and is connected to any power operated means, not shown, for adjusting the plow. Upon moving the bell-crank 26, the member 18 and the axle 19 are moved into the position shown in dotted lines in Figure 1 and schematically in Figure 9.

It is important to note that when the furrow wheel is in an operating position, as shown in full lines in Figures 1 and 8, a line $a—a$ drawn through the center of the sleeve portion 18 intersects a line $b—b$ at $e$. The line $b—b$ is drawn from the contact point of the furrow wheel 23 with the ground to the center of the axle portion 22, on which the furrow wheel 23 rotates. In other words, when the furrow wheel is in an operating position, the furrow wheel 23 and axle 19 cannot caster by virtue of the journal of the spindle in the sleeve portion 18 of the member 16.

The side face of the vertical furrow wall contacts the side of the furrow wheel substantially at a point $d$ which is on the line $b—b$. Referring now to Figure 8, it will be noted that the lines $a—a$ and $b—b$ intersect a line $c—c$ which is a forwardly extending line determined by the contact point of the furrow wheel with the ground. However, when the plow is raised to a transport position, as shown in dotted lines in Figure 1, and also in Figure 9, the furrow wheel 23 and axle 19 may caster on forward movement of the plow, since the line $a—a$ moves about the shaft 14 into a position in which the line $a—a$ intersects a point $f$ on the line $c—c$ substantially ahead of the point e on the line c—c. Hence, when the plow is raised to a transport position, the rear furrow wheel may caster when the plow is moved forwardly, although inhibited thereagainst by mechanism hereinafter described, until the direction of motion of the plow is changed, whereupon the forces acting upon the furrow wheel will permit it to caster. When the plow is in a transport position and is backed up, castering will again be inhibited and, inasmuch as it is desirable that backing-up be effected in a straight line, this inhibition against castering is of great importance.

In Figure 3, a rear view of the plow in a raised position is shown. It is to be noted in this view, by virtue of the mounting of the member 16 on the downwardly and rearwardly extending shaft 14, that the furrow wheel 23 straightens up so that it rotates substantially on its periphery when the plow is in a raised position. It is desirable to have the wheel rotate in this position or a substantially vertical plane, since the rear end of the plow will not whip excessively when it is transported.

The furrow wheel axle 19 is held against excessive movement with respect to the sleeve portion 18 of the member 16 by a cam means 30 operatively connected between the axle 19 and the portion 18. This construction is shown in detail in Figures 4, 5, 6, and 7 and comprises a plate 31 which encircles the lower portion of the spindle portion 20 of the axle 19, secured thereto by a weld 32. The plate 31 extends rearwardly and is provided with an arcuate slot 33 and an opening 34. A cam plate 35 also encircles the portion 20 and has three equally spaced V-shaped notches 36 provided in one side thereof. The cam plate 35 is positioned adjacent the plate 31, as shown in Figure 5, and is provided with a rearwardly extending ear 37 having an opening 38. A bolt 39 is inserted in the opening 38 and the arcuate slot 33 for securing the cam plate 35 to the plate 31. The lower edge of the portion 18 has a flared end 40 which is also provided with three equally spaced V-shaped notches 41. A part 42 having an opening 43 is inserted over the portion 20 of the axle 19 and is positioned between the cam plate 35 and the flared end 40. The part 42 is provided with three equally spaced portions 44 in each of which is an opening 45. A ball 46 is set in each of the openings 45, as shown in Figures 4 and 5. The sectional views in Figures 6 and 7 show how one of the balls 46 seats itself in the V-shaped grooves 36 and 41. The grooves are so positioned that the average amount of lead or toe-in for the furrow wheel may be provided when the device is manufactured. However, many times it is desirable to give the furrow wheel more or less lead in which case the bolt 39 is loosened and the cam plate moved to the right or left. This adjustment moves the V-shaped notch 36 with respect to the V-shaped notch 41. As shown in Figure 6, the ball 46 seats itself in the apex of the V-shaped grooves, but, when the cam plate 35 is moved about the portion 20 of the axle 19, the ball 46 seats itself against alternate sides of the V-shaped grooves 36 and 41, as shown in Figure 7. Since the entire weight of the rear end of the plow is carried on the balls 46, they will tend to stay seated in the apex or against alternate sides of the V-shaped grooves, unless the plow is in a transport position. In this case, the rear of the plow will move slightly in a vertical direction, because the hitch point of the plow is above the axis of the main supporting wheels, and some of the load is taken off of the furrow wheel so that it may caster freely on forward movement of the plow. In other words, when the plow is moved forwardly, there is a slight relief of the load on the balls 46, although sufficient load remains to impose a resistance to castering of the furrow wheel, since the portion 18 of the member 16 is inclined forwardly and the draft device moves the rear of the plow upwardly about the axis of the main supporting wheels. A spring 47 connected to an eye 48 at the upper end of the portion 18 and to a bolt 49, which is inserted in the opening 34 in the plate 31, holds the V-shaped grooves 36 and 41 in contact with the balls 46 at all times.

Figure 9:
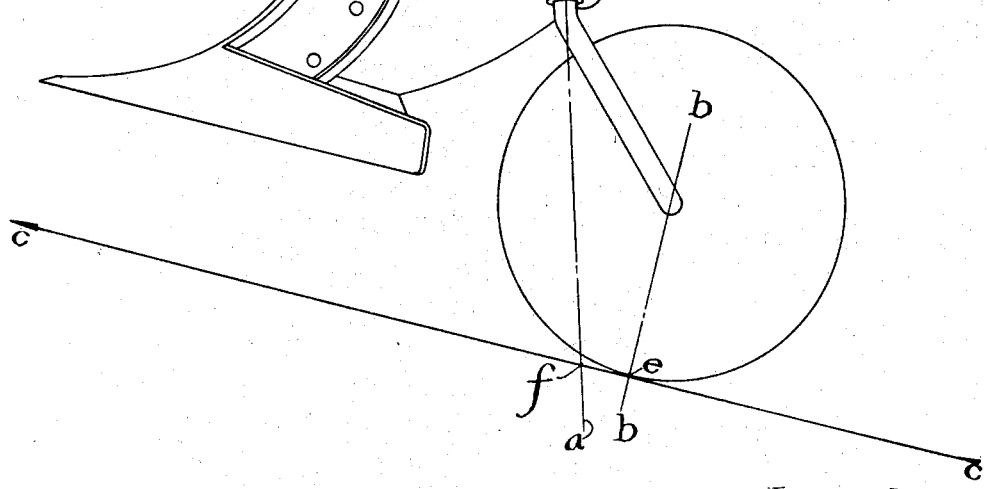
Figure 9 is similar to Figure 8 but shows the plow in a transport position.

Many times during the operation of the plow it is necessary to back up the plow. Heretofore this could not be done because the furrow wheel would caster around and lock with the plow bottom. By the present invention, the plow may be backed up if desired, and the furrow wheel will not caster. When the plow is backed up or moved forward in operating position, as shown in Figure 8, the lines a—a and b—b intersect the line c—c at the contact point of the wheel with the ground, and there is no force tending to rotate the furrow wheel about its inclined axis. However, when the plow is in transport position, as shown in Figure 9, the line a—a intersects the line c—c at a point in advance of that at which the wheel contacts the ground, so that the moment arm f—e constitutes a force tending to cause the wheel to caster. On the other hand, as pointed out above, the contact of the balls 46 with the V-shaped grooves 36 and 41, aided by the action of the spring 47, imposes a resistance to the turning of the axle 19 in shaft portion 20 sufficient to inhibit castering of the furrow wheel upon forward and rearward movement of the plow in a straight line. However, it is clear that, upon changing the direction of the plow, the balls 46 will become unseated on one side and allow castering of the wheel.

In view of the foregoing description, it should be apparent that a novel furrow wheel construction has been provided for a plow. All the desired operating features of a furrow wheel, which heretofore have not been possible, are accomplished by this device. Further, the device is simple and economical to manufacture.

While only a preferred construction embodying the principles of the present invention has been shown and described, it is to be understood that the invention is not to be limited to the specific details shown and described, but that, in fact, widely different means may be employed in the practice of the broader aspects of the present invention.

What is claimed is:

1. In an agricultural implement, a frame, a supporting member movably mounted on the frame, a ground-contacting wheel carried by the supporting member for rotation in a plane at an angle with respect to the ground, power operated means for vertically moving the supporting member to vary the position of the wheel with respect to the frame, and cooperative means between said frame and said member independent of the means for vertically moving the member and automatically operable during the vertical movement of said member to tilt said wheel, whereby to change the angle of inclination thereof with respect to the ground.

2. In an agricultural implement, a frame, a ground-contacting wheel connected to the frame for generally vertical movement with respect thereto and rotatable in a plane at an angle with respect to the ground when the implement is in operating position, means on the frame operatively connected to the wheel for generally vertically moving the wheel with respect thereto to raise and lower the frame, an axle journaling the wheel, and cooperative means between said frame and said wheel independent of the raising and lowering means operable to automatically tilt said axle upon vertical movement of the wheel, whereby the angle of inclination of said wheel with respect to the ground is changed.

3. In an agricultural implement, a frame, means serving as an axle carried by the frame for swinging movement in a longitudinally extending generally vertical plane, a ground-contacting wheel mounted on the axle for vertical movement therewith to raise and lower the frame and rotatable in a plane at an angle laterally inclined from the vertical when the implement is in operating position, power operated means on the frame for swinging the axle to raise and lower the implement, and cooperative means between the frame and the axle independent of said raising and lowering means and automatically operable during raising of the frame to laterally tilt the axle in a direction to increase the angle of inclination of the wheel with respect to the ground.

4. In a plow, the combination of a frame, a plow beam having an earth-working tool secured thereto, an axially rotatable member pivoted on the frame on a transversely extending downwardly and rearwardly inclined axis for swinging movement in a generally vertical plane, a furrow wheel carried by the member, means for pivoting said member about said axis to raise and lower the plow, the mounting of said member being so positioned and arranged that when the plow is in operating position the axis of said member will approximately pass through the point of contact of said wheel with the ground, and when the plow is in transport position the axis of said member will pass through a forward line determined by the direction of travel of the plow at a point in advance of the contact point of said furrow wheel.

5. In a plow, the combination of a plow beam having an earth-working tool secured thereto, a member mounted on the rear of the plow beam for generally vertical swinging movement about a downwardly and rearwardly extending axis, a furrow wheel carried by the member, means for moving said member about said axis to raise and lower the plow, the mounting of said member being so positioned and arranged that when the plow is in operating position the said furrow wheel travels at an angle with respect to a vertical line passing through the point of contact of said wheel with the ground, and as the plow is raised to transport position said angle diminishes.

6. In a plow, the combination of a plow beam having an earth-working tool secured thereto, an axially rotatable member mounted on the rear of the plow beam for generally vertical swinging movement about a downwardly and rearwardly extending axis, a furrow wheel carried by the member, means for moving said member about said axis to raise and lower the plow, the mounting of said member being so positioned and arranged that when the plow is in operating position the said furrow wheel travels at an angle with respect to a vertical line passing through the point of contact of said wheel with the ground, while the axis of said member approximately passes through the contact point of said wheel with the ground, and as the plow is raised to transport position said angle diminishes while the axis of said member passes, at a point in advance of said wheel, through a line drawn in the direction of travel of the plow from the contact point of said wheel with the ground.

7. In an agricultural implement having a tool-carrying frame, a member pivoted on the frame on a transversely extending downwardly and rearwardly inclined axis for swinging movement in a generally vertical plane, a furrow wheel carried by the member arranged to travel at an angle with respect to a vertical line passing through the point of contact of said wheel with the ground, and means mounting said member for axial rotation, the pivotal mounting of said member on said frame being such that as the implement is raised to transport position the said angle diminishes.

8. The combination with a plow-carrying frame of a member having a bearing portion pivoted on the frame on a downwardly and rearwardly extending axis and a sleeve portion extending upwardly from said bearing portion, a furrow wheel having a spindle journaled in the sleeve portion, means for moving said member about its downwardly and rearwardly extending axis to raise and lower the plow-carrying frame, the axis of said sleeve portion intersecting the contact point of the furrow wheel at a point on a forward line determined by the direction of travel of the plow when the plow is in an operating position, and the axis of said sleeve portion intersecting a point on said forward line substantially ahead of the contact point of the furrow wheel with said forward line when the plow is in a transport position.

9. The combination with a plow-carrying frame of a member having a bearing portion pivoted on the frame on a downwardly and rearwardly extending axis and a sleeve portion extending upwardly from said bearing portion, a furrow wheel having a spindle journaled in the sleeve portion so that said furrow wheel may caster, means for moving said member about its downwardly and rearwardly extending axis to raise and lower the plow-carrying frame, the axis of said sleeve portion intersecting the contact point of the furrow wheel at a point on a forward line determined by the direction of travel of the plow whereby the furrow wheel cannot caster on forward or rearward movement of the plow when the plow is in an operating position, and the axis of said sleeve portion intersecting a point on said forward line substantially ahead of the contact point of the furrow wheel with said forward line whereby the furrow wheel can caster on forward or rearward movement of the plow when the plow is in a transport position, and means imposing a resistance to the rotation of said spindle in said sleeve.

10. In a plow, the combination of a plow beam having an earth-working tool secured thereto, a member movably mounted on the rear of the plow beam and having an upwardly extending sleeve portion, an axle journaled in the sleeve portion of said member and extending rearwardly thence outwardly and downwardly, a furrow wheel journaled on the outwardly and downwardly extending portion of the axle and adapted to ride in the furrow formed by the earth-working tool, means for moving said member to raise and lower the earth-working tool, the axis of said sleeve portion of the member intersecting the contact point of the furrow wheel at a point on a forward line determined by the direction of travel of the plow whereby the furrow wheel cannot caster on forward or rearward movement of the plow when the plow is in an operating position, and the axis of said sleeve portion intersecting a point on said forward line substantially ahead of the contact point of the furrow wheel with said forward line whereby the furrow wheel can caster on forward or rearward movement of the plow when the plow is in a transport position, and means positioned between the axle and the member tending to hold the axle from rotating in said sleeve.

11. In a plow, the combination of a plow beam having an earth-working tool secured thereto, a member movably mounted on the rear of the plow beam and having an upwardly extending sleeve portion, an axle journaled in the sleeve portion of said member and extending rearwardly thence outwardly and downwardly, a furrow wheel journaled on the outwardly and downwardly extending portion of the axle and adapted to ride in the furrow formed by the earth-working tool, means for moving said member to raise and lower the earth-working tool, the axis of said sleeve portion of the member intersecting the contact point of the furrow wheel at a point on a forward line determined by the direction of travel of the plow whereby the furrow wheel cannot caster on forward or rearward movement of the plow when the plow is in an operating position, and the axis of said sleeve portion intersecting a point on said forward line substantially ahead of the contact point of the furrow wheel with said forward line whereby the furrow wheel can caster on forward or rearward movement of the plow when the plow is in a transport position, means positioned between the axle and the member tending to hold the axle from rotating in said sleeve, and yieldable means connecting the member and the axle.

12. In a plow, the combination of a plow beam having an earth-working tool secured thereto, a member movably mounted on the rear of the plow beam and having an upwardly extending sleeve portion, an axle journaled in the sleeve portion of said member, a furrow wheel journaled on the axle and adapted to ride in the furrow formed by the earth-working tool, means for moving said member to raise and lower the earth-working tool, the axis of said sleeve portion of the member intersecting the contact point of the furrow wheel at a point on a forward line determined by the direction of travel of the plow whereby the furrow wheel cannot caster on forward or rearward movement of the plow when the plow is in an operating position, and the axis of said sleeve portion intersecting a point on said forward line substantially ahead of the contact point of the furrow wheel with said forward line whereby the furrow wheel can caster on forward or rearward movement of the plow when the plow is in a transport position, and means positioned between the axle and the member tending to hold the axle from rotating in said sleeve.

13. In a plow, the combination of a plow beam having an earth-working tool secured thereto, a member movably mounted on the rear of the plow beam and having an upwardly extending sleeve portion, an axle journaled in the sleeve portion of said member, a furrow wheel journaled on the axle and adapted to ride in the furrow formed by the earth-working tool, means for moving said member to raise and lower the earth-working tool, the axis of said sleeve portion of the member intersecting the contact point of the furrow wheel at a point on a forward line determined by the direction of travel of the plow whereby the furrow wheel cannot caster on forward or rearward movement of the plow when the plow is in an operating position, and the axis of said sleeve portion intersecting a point on said forward line substantially ahead of the contact point of the furrow wheel with said forward line whereby the furrow wheel can caster on forward or rearward movement of the plow when the plow is in a transport position, means positioned between the axle and the member tending to hold the axle rotating in said sleeve, and yieldable means connecting the member and the axle.

14. In a plow, the combination of a plow beam having an earth-working tool secured thereto, a member movably mounted on the rear of the plow beam and having an upwardly extending sleeve portion, an axle journaled in the sleeve portion of said member and extending rearwardly thence outwardly and downwardly, a furrow wheel journaled on the outwardly and downwardly extending portion of the axle and adapted to ride in the furrow formed by the earth-working tool, means for moving said member to raise and lower the earth-working tool, the axis of said sleeve portion of the member intersecting the contact point of the furrow wheel at a point on a forward line determined by the direction of travel of the plow whereby the furrow wheel cannot caster on forward or rearward movement of the plow when the plow is in an operating position, and the axis of said sleeve portion intersecting a point on said forward line substantially ahead of the contact point of the furrow wheel with said forward line whereby the furrow wheel can caster on forward or rearward movement of the plow when the plow is in a transport position, and cam means positioned between the axle and the member tending to hold the axle from rotating in said sleeve.

15. In a plow, the combination of a plow beam having an earth-working tool secured thereto, a member movably mounted on the rear of the plow beam and having an upwardly extending sleeve portion, an axle journaled in the sleeve portion of said member, a furrow wheel journaled on the axle and adapted to ride in the furrow formed by the earth-working tool, means for moving said member to raise and lower the earth-working tool, the axis of said sleeve portion of the member intersecting the contact point of the furrow wheel at a point on a forward line determined by the direction of travel of the plow whereby the furrow wheel cannot caster on forward or rearward movement of the plow when the plow is in an operating position, and the axis of said sleeve portion intersecting a point on said forward line substantially ahead of the contact point of the furrow wheel with said forward line whereby the furrow wheel can caster on forward or rearward movement of the plow when the plow is in a transport position, cam means positioned between the axle and the member tending to hold the axle from rotating in said sleeve, and spring means connecting the member and the axle.

16. In a plow, the combination of a plow beam having an earth-working tool secured thereto, a member movably mounted on the rear of the plow beam and having an upwardly extending sleeve portion, an axle journaled in the sleeve portion of said member, a furrow wheel journaled on the axle and adapted to ride in the furrow formed by the earth-working tool, means for moving said member to raise and lower the earth-working tool, adjustable means disposed between the member and the beam for limiting the movement of the member in one direction, the axis of said sleeve portion of the member intersecting the contact point of the furrow wheel at a point on a forward line determined by the direction of travel of the plow whereby the furrow wheel cannot caster on forward or rearward movement of the plow when the plow is in an operating position, and the axis of said sleeve portion intersecting a point on said forward line substantially ahead of the contact point of the furrow wheel with said forward line whereby the furrow wheel can caster on forward or rearward movement of the plow when the plow is in a transport position, and means positioned between the axle and the member tending to hold the axle from rotating in said sleeve.

17. The combination with a plow-carrying frame of a member having a bearing portion pivoted on the frame on a downwardly and rearwardly extending axis and a sleeve portion extending upwardly from said bearing portion, a furrow wheel having a spindle journaled in the sleeve portion so that said furrow wheel may caster, means for moving said member about its downwardly and rearwardly extending axis to raise and lower the plow-carrying frame, adjustable means disposed between the member and the frame for limiting the movement of the member in one direction, the axis of said sleeve portion intersecting the contact point of the furrow wheel at a point on a forward line determined by the direction of travel of the plow whereby the furrow wheel cannot caster on forward or rearward movement of the plow when the plow is in an operating position, and the axis of said sleeve portion intersecting a point on said forward line substantially ahead of the contact point of the furrow wheel with said forward line whereby the furrow wheel can caster on forward or rearward movement of the plow when the plow is in a transport position, and means imposing a resistance to the rotation of said spindle in said sleeve.

18. The combination with a plow-carrying frame of a member having a bearing portion pivoted on the frame on a downwardly and rearwardly extending axis and a sleeve portion extending upwardly from said bearing portion, a furrow wheel having a spindle journaled in the sleeve portion so that said furrow wheel may caster, means for moving said member about its downwardly and rearwardly extending axis to raise and lower the plow-carrying frame, adjustable means disposed between the member and the frame for limiting the movement of the member in one direction, adjustable means disposed between the axle and the member for adjusting the lead of the furrow wheel and tending to hold the axle from rotating within said sleeve, the axis of said sleeve portion intersecting the contact point of the furrow wheel at a point on a forward line determined by the direction of travel of the plow whereby the furrow wheel cannot caster on forward or rearward movement of the plow when the plow is in an operating position, and the axis of said sleeve portion intersecting a point on said forward line substantially ahead of the contact point of the furrow wheel with said forward line whereby the furrow wheel can caster on forward or rearward movement of the plow when the plow is in a transport position.

JOHN R. ORELIND.
JAMES MORKOSKI.

REFERENCES CITED

The following references are of record in the file of this patent:

UNITED STATES PATENTS

| Number | Name | Date |
| --- | --- | --- |
| 676,911 | Poole | June 25, 1901 |
| 828,160 | Weeks | Aug. 7, 1906 |
| 1,262,722 | Waterman | Apr. 16, 1918 |
| 2,044,718 | Rutter | June 16, 1936 |
| 2,056,374 | Strandlund | Oct. 6, 1936 |